N. & R. E. Johnson,
Milk Cooler.
No. 113,302. Patented Apr. 4, 1871.
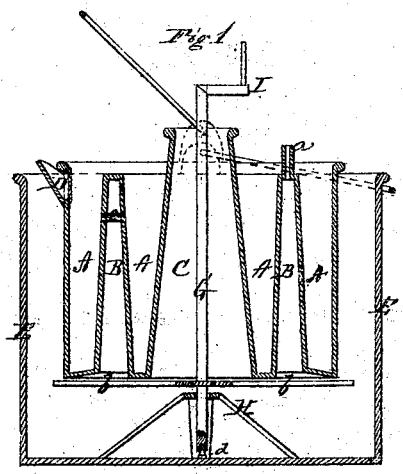
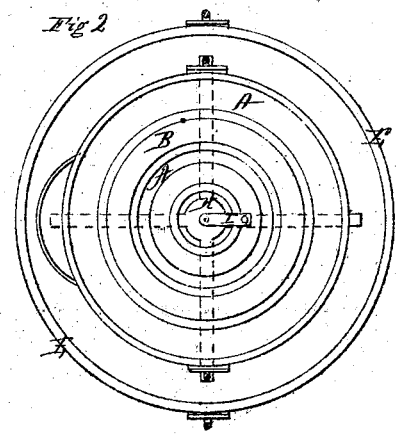
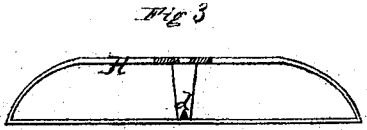
Witnesses
Harry King
C. L. Evart
Inventor
Nelson Johnson
Rawson E. Johnson
per
Alexander Mason
Attys.

United States Patent Office.

NELSON JOHNSON AND RANSOM E. JOHNSON, OF JASPER, NEW YORK.

Letters Patent No. 113,302, dated April 4, 1871; antedated March 21, 1871.

IMPROVEMENT IN MILK-COOLERS.

The Schedule referred to in these Letters Patent and making part of the same.

*To all whom it may concern:*

Be it known that we, NELSON JOHNSON and RANSOM E. JOHNSON, of Jasper, in the county of Steuben and in the State of New York, have invented certain new and useful Improvements in Milk-Coolers; and do hereby declare that the following is a full, clear, and exact description thereof, reference being had to the accompanying drawing and to the letters of reference marked thereon making a part of this specification.

The nature of our invention consists in the construction and arrangement of a milk-cooler, as will be hereinafter fully set forth.

In order to enable others skilled in the art to which our invention appertains to make and use the same, we will now proceed to describe its construction and operation, referring to the annexed drawing, in which—

Figure 1 is a longitudinal vertical section, and

Figure 2 is a plan view of our milk-cooler.

Figure 3 is a sectional view of the support for the milk-cooler.

This milk-cooler or hollow pail may be made with one or more rings A, for the milk, with a space, B, for water between each two rings A, intended for the milk.

The pail A B is made in one, with an opening, C, through the center, the milk-rings A A being open at the top but closed at the bottom, while the water-space B is just the reverse.

These rings may be made funnel-shaped, as represented in the drawing; or they may be made perpendicular and the outside flared out, as will be most convenient; or the outside and inside may be both made flaring in opposite directions.

This cooler is further provided with a strainer-spout, D, and with a hole or small tube, *a*, leading from the water-space B, so that the air will pass out and allow the water to fill the space from the under side of the cooler.

The space in the milk-cells should be wider at the top than at the bottom, to allow room for the hand and arm for washing the cooler.

This cooler is set into a vat or tub, E, of water a sufficient time to cool it to a sufficient temperature for the cream to rise.

Within this vat or tub is placed a spindle or upright shaft, G, with a shelf or arms, *b b*, upon which the cooler sits. This shaft is held upright by standing on the stepping *d*, at the lower end, and passing through a spider or support, H, that holds onto the shaft near the shelf or arms *b b*.

The shaft G passes through the central opening C of the cooler, and its upper end is provided with a hinge, so that it can be turned down to form the crank I. By taking hold of this crank the cooler can be revolved in the vat or tub of water, and thereby cool the milk quicker than it would if it was to remain stationary in the water, as it will stir up the water and keep it of a uniform coolness next to the cooler, and it will also change the milk in the cooler and keep up a good circulation.

A small pipe, *e*, passing through the water-space, connects the inner and outer milk-shells or rings A so that the milk can all be poured out through the strainer-spout D without running over the top of the water-space.

The spider or support H may either be made fast to the vat or tub, or made separate, in which case it should be made large enough to rest firmly against the inside of the tub, and the stepping *d* attached to said support, as shown in fig. 3.

We prefer this latter mode, as then the tub E may be used for other purposes.

Having thus fully described our invention,

What we claim as new, and desire to secure by Letters Patent, is—

1. A milk-cooler, A B C, composed of a connected series of concentric ring-shaped milk-vessels, A A, alternating with water-spaces B C, opening from beneath, and provided with strainer-spout D, air-hole *a*, and tube *e*, all substantially as and for the purposes herein set forth.

2. In combination with the milk-cooler A B C, the shaft G, with crank I and shelf or arms *b b*, the spider or support H, and stepping *d*, all substantially as and for the purposes herein set forth.

In testimony that we claim the foregoing we have hereunto set our hands and seals this 1st day of July, 1870.

NELSON JOHNSON. [L. S.]
    RANSOM E. JOHNSON. [L. S.]

Witnesses:
 JEROME M. SIMPSON,
 HENRY B. ANDREWS.